United States Patent [19]

Sardisco et al.

[11] 4,371,512
[45] Feb. 1, 1983

[54] PRODUCTION OF ALKALI METAL SULFATES

[75] Inventors: John B. Sardisco, Shreveport, La.; Erhart K. Drechsel, Montgomery, Tex.

[73] Assignee: Pennzoil Company, Houston, Tex.

[21] Appl. No.: 231,361

[22] Filed: Feb. 3, 1981

[51] Int. Cl.³ .................... C01D 15/06; C22B 26/10; C01B 17/74
[52] U.S. Cl. .................. 423/551; 423/181; 423/530; 423/531; 423/552
[58] Field of Search .............. 423/522, 525, 530, 531, 423/551, 552, 553, 181, 199, 208; 210/638, 683

[56] References Cited

U.S. PATENT DOCUMENTS

| | | | |
|---|---|---|---|
| 873,070 | 12/1907 | Nibelius | 423/208 |
| 995,105 | 6/1911 | Thompson . | |
| 2,816,820 | 12/1957 | Pernet . | |
| 2,902,341 | 9/1959 | Bamel . | |
| 3,331,661 | 7/1967 | Bolston et al. | 423/184 |
| 3,364,202 | 1/1968 | De Rooij et al. | 423/531 |
| 3,687,639 | 10/1972 | Barlow et al. . | |
| 3,749,648 | 7/1973 | Boettler et al. | 423/531 |
| 3,998,935 | 12/1976 | Adams et al. . | |
| 4,104,365 | 8/1978 | Howard et al. | 423/199 |

FOREIGN PATENT DOCUMENTS

| | | | |
|---|---|---|---|
| 42-27246 | 12/1967 | Japan . | |
| 55-10421 | 1/1980 | Japan | 423/525 |
| 1145390 | 3/1969 | United Kingdom . | |
| 478461 | 8/1975 | U.S.S.R. | 423/551 |

OTHER PUBLICATIONS

Bulter et al., The Action of Alcohol on the Sulfates of Sodium, J. Chem. Soc., vol. 117, pp. 649–667, 1920.
Dunniclift, The Hydrogen Sulfates of the Alkali Metals and Ammonium, J. Chem. Soc., vol. 123, pp. 731–738, 1923.

*Primary Examiner*—Gary P. Straub
*Attorney, Agent, or Firm*—Lowe, King, Price & Becker

[57] ABSTRACT

Alkali metal sulfates are produced from an aqueous solution containing alkali metal hydrogen sulfate which comprises contacting the aqueous solution of alkali metal hydrogen sulfate with a hydrophilic solvent, the hydrophilic solvent being effective to extract at least a portion of the sulfuric acid formed as the alkali metal hydrogen sulfate is converted to alkali metal sulfate in the solution, together with at least a portion of the water present; permitting the alkali metal sulfate solid to crystallize; and recovering the solid alkali metal sulfate product. The hydrophilic solvent may then be extracted and separated from the sulfuric acid with a hydrophobic solvent and both solvents can be recovered and recycled.

12 Claims, 1 Drawing Figure

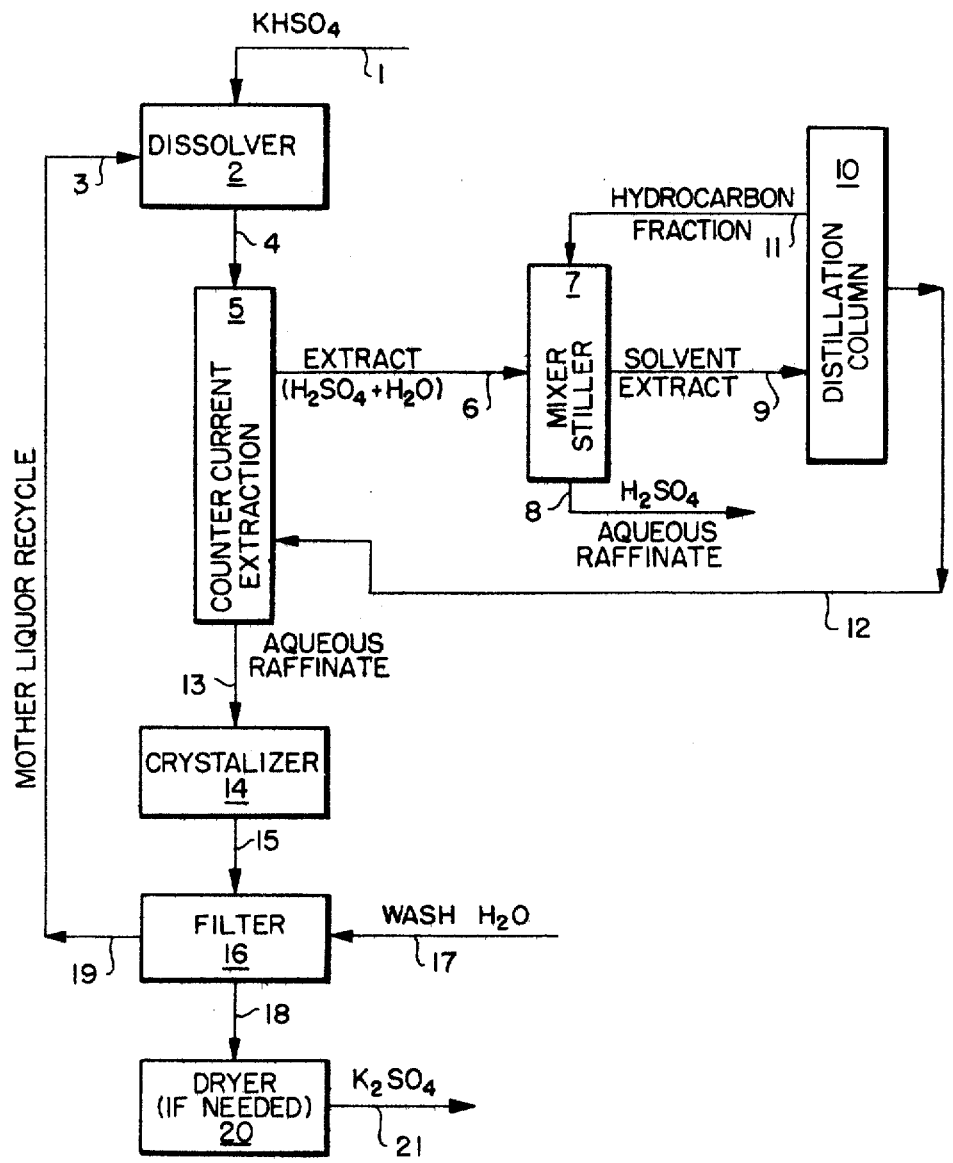

PRODUCTION OF ALKALI METAL SULFATES

TECHNICAL FIELD

This invention relates to methods for the production of alkali metal sulfates and more particularly, to a method for the production of alkali metal sulfates from alkali metal hydrogen sulfates by solvent extraction.

BACKGROUND ART

Alkali metal sulfates are well known inorganic compounds which have found great utility in many areas such as in agricultural chemicals and in detergent compositions. Potassium sulfate and sodium sulfate are also both well known as inorganic industrial chemicals which are also used as intermediates for production of many other useful products.

As a result of the need for such products, the prior art has been aware of various methods for preparation of these materials for many years. In a common procedure, alkali metal sulfates are prepared by the reaction of alkali metal chloride and sulfuric acid. Usually, however, it is necessary to carry out such reactions under rather severe reaction conditions in order to eliminate the hydrogen chloride evolved during the reaction and shift the reaction toward production of the alkali metal sulfate. An inherent problem in carrying out this process is that it is a two-step reaction involving an intermediate reaction in which the alkali metal chloride and sulfuric acid react to form alkali metal bisulfate or alkali metal hydrogen sulfate with the elimination of one mole of hydrogen chloride. It has been difficult, however, to carry this reaction to completion and eliminate the additional mole of hydrogen chloride because of the thermodynamics involved in the reaction. For these reasons, it has been necessary for the art to utilize rather extreme reaction conditions, for example, temperatures well above 100° C. in order to obtain an economically attractive yield of alkali metal sulfate of reasonable purity. These extreme reaction conditions, however, merely cause additional problems as the strong sulfuric acid and chlorine present at the high temperatures cause severe corrosion problems.

In most of the prior art procedures, the key to a successful process resides in complete elimination of the HCl gas. A large body of art is available which discloses such reactions involving the production of $K_2SO_4$ or $Na_2SO_4$. A typical art reference of this type is U.S. Pat. No. 2,762,689 which involved the reaction of NaCl and $H_2SO_4$ at temperatures of 200° to 250° C. Also in U.S. Pat. No. 2,275,825, $Na_2SO_4$ and hydrochloric acid are prepared by the reaction of a slurry comprising water, NaCl, $NaHSO_4$ and $H_2SO_4$, with steam in a countercurrent reaction zone at temperatures of 120° to 160° C. With respect to prior art of this type, it should be noted that the aqueous sulfuric acid systems of $Na_2SO_4$ and $K_2SO_4$ are not generally considered to be equivalent in the recovery of desired products as they behave differently. Thus, $K_2SO_4$ forms mixed acid salts on solution/crystallization whereas $Na_2SO_4$ forms hydrates of either $Na_2SO_4$ or $NaHSO_4$, "Solubilities of Inorganic and Metal Organic Compounds", Seidell 4th ed., vol. 2, pp. 1126–27.

A prior art disclosure related to the present invention is U.S. Pat. No. 3,687,639 which discloses a process of precipitating $K_2SO_4$ crystals from an aqueous solution of $K_2SO_4$ by dissolving sufficient KCl in the solution to affect the solubility of the $K_2SO_4$ and cause it to crystallize. However, this is strictly a physical procedure as the $K_2SO_4$ is already formed. A similar reference with respect to sodium sulfate recovery is U.S. Pat. No. 2,125,624. However, these patents are not concerned with the particular reaction of the present invention.

Partial solutions to these problems are found in U.S. Pat. No. 3,998,935 and Japanese Pat. No. 42-27246. In these prior patents, potassium sulfate is produced by the reaction of potassium chloride in an aqueous solution containing potassium hydrogen sulfate at temperatures of about 65°–110° C., cooling the solution and permitting the potassium sulfate to crystallize from solution. While these reactions can be carried out at moderate temperature conditions, it has been found that problems are caused by excessive buildup of HCl and the requirement for evaporation of large amounts of water.

Other patents which relate to the production of alkali metal sulfates and hydrogen chloride include British Pat. No. 1,145,390, U.S. Pat. No. 995,105, U.S. Pat. No. 2,816,820, and U.S. Pat. No. 2,902,341. These patents disclose reactions for obtaining alkali metal sulfates from aqueous solutions.

There accordingly remains a need in the art for a process for the production of alkali metal sulfates from reactions systems which involve moderate reaction conditions and with reusable reactants. The present invention provides a solution to this need.

SUMMARY OF THE INVENTION

It is accordingly one object of this invention to provide a method for the preparation of alkali metal sulfates.

A further object of the invention is to provide a method for the production of alkali metal sulfates from alkali metal hydrogen sulfates in aqueous systems.

A still further object of the invention is to provide a method for the production of alkali metal sulfates in an aqueous system from alkali metal dihydrogen sulfates using a solvent extraction system.

Other objects and advantages of the present invention will become apparent as the description thereof proceeds.

In satisfaction of the foregoing objects and advantages, there is provided by this invention a method for the production of alkali metal sulfates which comprises the following steps:

(a) forming an aqueous solution containing an alkali metal hydrogen sulfate;

(b) contacting said aqueous solution of alkali metal hydrogen sulfate with at least a sufficient amount of a hydrophilic solvent to be effective to extract at least a portion of sulfuric acid formed as alkali metal hydrogen sulfate is converted to alkali metal sulfate under the conditions of the reaction;

(c) permitting the alkali metal sulfate solid to crystallize; and (d) recovering the solid product.

The present invention also provides a method by which this reaction can be carried out with additional steps for recovery and reuse of the solvent system employed including extraction of the sulfuric acid hydrophilic solvent solution with a hydrophobic solvent to recover the sulfuric acid and recovering and recycling the hydrophilic and hydrophobic solvents in the system. Also provided is a continuous system for practice of this process including the use of hydrophilic solvent and hydrophobic solvent pairs wherein the reactions and extractions are carried out simultaneously.

BRIEF DESCRIPTION OF THE DRAWINGS

Reference is now made to the drawing accompanying this application wherein there is shown a schematic diagram for practicing the process steps of a continuous method of the present invention.

BEST MODE FOR CARRYING OUT THE INVENTION

As pointed out above, the present invention is concerned with a method for the production of alkali metal sulfates from aqueous solutions containing alkali metal hydrogen sulfates. The invention is considered to be applicable to the production of any alkali metal sulfate but is primarily concerned with the production of potassium sulfate and sodium sulfate. The specific embodiment of the invention will be described with respect to production of potassium sulfate from aqueous solutions of potassium hydrogen sulfate.

The present invention provides a method for the production of alkali metal sulfates which are substantially free of chloride ions and which makes use of a solvent extraction system. In general, the process may be described as the extraction of hydrogen ions as sulfuric acid from an aqueous solution of alkali metal hydrogen sulfate using suitable solvents. It has been found that when the sulfuric acid is extracted from the aqueous solution using a hydrophilic solvent, that the solvent will be effective to extract a sufficient amount of sulfuric acid and usually some water so as to remove sufficient hydrogen ions from the solution to cause the alkali metal hydrogen sulfate to convert to alkali metal sulfate. There is then recovered from this reaction a mixture of the alkali metal sulfate in combination with the sulfuric acid which has been extracted into the hydrophilic solvent. The alkali metal sulfate is a solid and will then crystallize from solution and can be recovered by conventional separation techniques.

The remaining solvent solution of sulfuric acid, solvent, and usually some water, is then extracted with a hydrophobic solvent which extracts the hydrophilic solvent from the sulfuric acid. The sulfuric acid may then be concentrated and reused as necessary including use in production of additional alkali metal hydrogen sulfate.

The starting solution for the present invention comprises an aqueous solution of alkali metal hydrogen sulfate, preferably a solution of potassium hydrogen sulfate. A preferred aqueous solution would contain about 20–50 weight percent of alkali metal hydrogen sulfate. A 25–40 weight percent solution of alkali metal hydrogen sulfate is preferred for best results. The remainder of the solution is primarily water although the solution could contain at least a small proportion of sulfuric acid. Normally, this solution would be obtained from the preparation of alkali metal hydrogen sulfate by the reaction of an alkali metal chloride with sulfuric acid and resultant formation of the 20–50 weight percent solution of alkali metal hydrogen sulfate.

To this solution contained in a vessel, preferably with agitation, is added a sufficient amount of a hydrophilic solvent to extract hydrogen ions and thus sulfuric acid from the solution. It has been found that this extraction of sulfuric acid from the solution removes hydrogen ions and results in conversion of the alkali metal hydrogen sulfate to alkali metal sulfate. As a result there is formed a resulting reaction mixture comprising solid alkali metal sulfate in an aqueous solution containing hydrophilic solvent, the sulfuric acid extracted from the solution, and water.

The hydrophilic solvents which may be employed in this step of the process include those lower alkyl alcohols which are essentially only slightly soluble in water and which are of the formula ROH wherein R is an alkyl chain. Suitable hydrophilic solvents which may be used include n-butyl alcohol, isobutyl alcohol, n-pentyl alcohol, isopentyl alcohol, n-hexyl alcohol, n-heptyl alcohol, n-octyl alcohol, n-nonyl alcohol, and mixtures thereof. The preferred hydrophilic solvents are n-butyl alcohol and isobutyl alcohol.

The reaction is carried out essentially at room temperature and preferably at any temperature ranging from about 20° C. up to about 70° C. For economic reasons the use of ambient temperatures are especially preferred together with atmospheric pressure.

After completion of the reaction, the resulting mixture is treated to separate the solid from the liquid. Usually the liquid will be a two layer system which includes solvent as one layer and water as another since water is only slightly soluble in the hydrophilic solvent. The solid and the aqueous phase may then be drawn off and separated to provide the solid alkali metal sulfate and the aqueous phase.

The resulting nonaqueous solvent phase or organic phase contains the hydrophilic solvent, the sulfuric acid extracted from the solution and a small amount of water. This mixture is then treated to extract the hydrophilic solvent solution with a hydrophobic solvent so as to separate the hydrophilic solvent from the sulfuric acid contained in the solution. Thus, sufficient hydrophobic solvent should be used to extract all of the hydrophilic solvent contained in the solution. Preferred hydrophobic solvents which may be used are aromatic hydrocarbons having about 6–10 carbon atoms such as benzene, toluene and the xylenes, aliphatic hydrocarbons having carbon chains of about 5–10 carbon atoms such as n-pentane, n-hexane, n-heptane, and n-octane, and cycloaliphatic hydrocarbons having 5–8 carbon atoms such as cyclopentane, cyclohexane and cycloheptane. Mixtures may also be used where compatible. Other hydrophobic solvents which may be used include kerosene, and low boiling naphtha fractions.

This extraction is carried out at room temperature or at a temperature range of about 20° to 60° C. and using a sufficient amount of hydrophobic solvent to dissolve all the hydrophilic solvent contained in the solution. An excess of hydrophobic solvent is preferred. The hydrophobic solvent dissolves the hydrophilic solvent but does not dissolve the sulfuric acid present and thus effects a separation between the sulfuric acid and the hydrophilic solvent.

After the extraction is complete, the sulfuric acid is removed and reused as desired. The solvent solution may be separated by ordinary distillation and the hydrophilic solvent and hydrophobic solvent may be reused in the system.

As will be apparent, the process of this invention makes use of solvent pairs comprising combinations of hydrophilic and hydrophobic solvents. Preferred solvent pairs include a combination of normal-butanol with either benzene, normal-hexane or cyclohexane.

The process of the present invention lends itself suitably for continuous processing with recycle of reusable materials. A suitable continuous process and a further embodiment of the present invention are set forth in the attached drawing accompanying the application which represents a process for the conversion of potassium hydrogen sulfate to potassium sulfate using a continuous process according to the present invention.

In the drawing it will be seen that potassium hydrogen sulfate from line 1 is dissolved in dissolver 2 with mother liquor recycle from line 3 in order to form the potassium hydrogen sulfate solution. This resulting solution is then passed by line 4 to countercurrent extraction unit 5 for contact under countercurrent conditions with the hydrophilic solvent, in this case an alcoholic solvent such as isobutyl alcohol. The countercurrent extraction is maintained continuously and the hydrophilic solvent extract phase, which contains the sulfuric acid and some water, is removed by line 6 to mixer-settler 7 for extraction with the hydrophobic solvent from line 11. From mixer-settler 7, the sulfuric acid raffinate phase is removed by line 8 as an aqueous solution of sulfuric acid which may be processed for reuse as desired. Any hydrophilic solvent present, such as n-butyl alcohol, may be removed by azeotropic distillation.

The remaining solvent extract mixture is then removed by line 9 to distillation column 10 where the hydrophobic solvent fraction is removed and recycled by line 11. Any $H_2SO_4$ and $H_2O$ contained in the solvent is thus recycled. The hydrophilic solvent component is separated and recycled to the extractor 5 by line 12.

In the meantime, the aqueous raffinate phase from the countercurrent extraction unit is passed by line 13 to crystallizer 14 to precipitate a solid slurry of the potassium sulfate, preferably at a lowered temperature. The slurry is then removed by line 15 to filter or other separator 16 where the slurry is filtered with the solid potassium sulfate being removed by line 18. The filter cake is washed with wash water from line 17 which can be used to provide make-up water for that which is retained by the sulfuric acid. The solid potassium sulfate is removed by line 18 to drier 20 where the solid is dried if needed and recovered by line 21. The process liquors or mother liquors are removed by line 19 and recycled by line 3 to form additional solutions of potassium hydrogen sulfate in dissolver 2.

The following examples are presented to illustrate the invention, but it is not to be considered as limited thereto. In these examples and throughout the specification, parts are by weight unless otherwise indicated.

EXAMPLE I

The following experiments demonstrate the extraction of the sulfuric acid from an aqueous solution of potassium hydrogen sulfate with subsequent crystallization and recovery of potassium sulfate.

In each of the following experiments, potassium hydrogen sulfate was dissolved in water which was contained in a converted separatory funnel. The funnel was placed in an air heated chamber, and the solution was heated to temperature. Then, n-butyl alcohol was added and the mixture was stirred for about 30 minutes. At the end of this period, stirring was discontinued, and the slurry was allowed to settle for about 10 minutes to allow the three phases to separate. The solid and aqueous (raffinate) phases were drawn off and filtered in the heated chamber to separate the solid phase and raffinate. Both phases were weighed and analyzed. The organic phase (extract) was also weighed and analyzed. Below are the results for a number of runs.

| Experiment No. | A | B | C |
|---|---|---|---|
| Input Wt. (gms) | | | |
| $KHSO_4$ | 25 | 38 | 38 |
| HOH | 75 | 62 | 62 |
| n-butyl alcohol | 300 | 400 | 200 |
| Temp. (°C.) | 30 | 30 | 60 |
| Raffinate Analysis (Wt. %) | | | |
| $K_2SO_4$ | 20 | 25 | 44 |
| $H_2SO_4$ | 12 | 16 | 18 |
| n-butyl alcohol | 13 | 15 | — |
| HOH | 55 | 44 | — |
| Extract Analysis (Wt. %) | | | |
| $H_2SO_4$ | 0.9 | 1.6 | 0.9 |
| n-butyl alcohol | 89.1 | 89.2 | 92.0 |
| HOH | 10.0 | 9.2 | 7.1 |
| Solid Analysis (Wt. %) | | | |
| $K_2SO_4$ | 99 | 83 | 83 |
| $H_2SO_4$ | 1 | 17 | 17 |
| Wt. % $H_2SO_4$ Extracted into Organic Phase | 39 | 28 | 12 |
| Wt. % HOH Extracted into Organic Phase | 56–64 | 43–55 | 36–57 |
| Wt. % $K_2O$ Crystallized | 39 | 48 | 5 |

EXAMPLE II

This example illustrates the extraction of the normal-butyl alcohol from the alcohol-water-sulfuric acid solution of Example I.

In this example, the hydrophobic solvent employed was pentane or cyclohexane. In carrying out the example, pentane or cyclohexane was added to the alcohol-water-sulfuric acid solution in a converted separatory funnel. The mixture was then equilibrated at ambient conditions by stirring for about 10 minutes. Then the mixture was allowed to settle for about 3 minutes to allow the two phases to separate. The aqueous (raffinate) and organic (extract) phases were drawn from the funnel, weighed, and analyzed. Set forth below are the results for the experiment.

| Experiment No. | A | B | C | D |
|---|---|---|---|---|
| Input Wt. (gms) | | | | |
| $H_2SO_4$ | 1.5 | 1.0 | 2.0 | 2.0 |
| HOH | 23.5 | 9.0 | 8.0 | 8.0 |
| n-butyl alcohol | 75.0 | 90.0 | 90.0 | 90.0 |
| Pentane | 30.0 | 125 | 75.0 | — |
| Cyclohexane | — | — | — | 75.0 |
| Raffinate Analysis (Wt. %) | | | | |
| $H_2SO_4$ | 7.3 | 16.0 | 21.6 | 23.1 |
| Pentane | 0.0 | 0.0 | 0.0 | — |
| Cyclohexane | — | — | — | — |
| n-butyl alcohol | 5.0 | 9.7 | 11.0 | — |
| HOH | 87.7 | 74.3 | 67.4 | — |
| Extract Analysis (Wt. %) | | | | |
| $H_2SO_4$ | 0.2 | 0.2 | 1.0 | 1.1 |
| n-butyl alcohol | 77.0 | 43.0 | 49.2 | 51.9 |
| Pentane | 18.4 | 55.1 | 47.0 | — |
| Cyclohexane | — | — | — | 43.9 |
| HOH | 4.4 | 1.7 | 2.8 | 3.1 |

The invention has been described herein with reference to certain preferred embodiments. However, it is obvious that variations thereon will become apparent to those skilled in the art. The invention is not to be considered as limited thereto.

We claim:

1. A process for the production of an alkali metal sulfate from an alkali metal hydrogen sulfate which comprises the steps of:

(a) forming an aqueous solution of an alkali metal hydrogen sulfate;

(b) contacting said aqueous solution of alkali metal hydrogen sulfate with a hydrophilic solvent which is selected from the group consisting of n-butyl alcohol, isobutyl alcohol, n-pentyl alcohol, isopentyl alcohol, n-hexyl alcohol, n-heptyl alcohol, n-octyl alcohol, n-nonyl alcohol, and mixtures thereof, said solvent being effective to extract at least a portion of the sulfuric acid formed as the alkali metal hydrogen sulfate is converted to alkali metal sulfate; said extraction providing a mixture comprising alkali metal sulfate, hydrophilic solvent, sulfuric acid, and water;

(c) separating the hydrophilic solvent phase from the said mixture to form a residual mixture, and separating the sulfuric acid from the hydrophilic solvent by extraction of the hydrophilic solvent with a hydrophobic solvent;

(d) passing the residual mixture to a crystallizer to precipitate the alkali metal sulfate solid; and (e) recovering the solid alkali metal sulfate product.

2. A process according to claim 1 wherein the aqueous solution of alkali metal hydrogen sulfate is about a 20–50 wt. % alkali metal hydrogen sulfate solution.

3. A process according to claim 1 wherein the hydrophobic solvent is selected from the group consisting of aromatic hydrocarbons, cycloaliphatic hydrocarbons, aliphatic hydrocarbons, kerosene, low boiling naphtha fractions, and mixtures thereof.

4. A process according to claim 1 wherein the extraction is carried out at temperatures ranging from about 20°–70° C.

5. A process according to claim 1 wherein the alkali metal hydrogen sulfate is $KHSO_4$ and the product is $K_2SO_4$.

6. A process according to claim 1 wherein the hydrophilic solvent is normal-butyl alcohol or isobutyl alcohol and the hydrophobic solvent is selected from the group consisting of benzene, normal-hexane, cyclohexane, and cyclopentane.

7. A process for the production of an alkali metal sulfate in a continuous system which comprises the following steps:

(a) forming an aqueous solution of alkali metal hydrogen sulfate;

(b) contacting said alkali metal hydrogen sulfate solution with a hydrophilic solvent selected from the group consisting of n-butyl alcohol, isobutyl alcohol, n-pentyl alcohol, isopentyl alcohol, n-hexyl alcohol, n-heptyl alcohol, n-octyl alcohol, n-nonyl alcohol, and mixtures thereof, in an extraction phase using sufficient solvent and a sufficient contact time to extract sulfuric acid into the hydrophilic solvent and cause the alkali metal hydrogen sulfate to be converted to alkali metal sulfate, and form a mixture comprising alkali metal sulfate, hydrophilic solvent, sulfuric acid and water;

(c) separating the hydrophilic solvent phase from the said mixture to form a residual mixture, separating the sulfuric acid from the hydrophilic solvent by extraction of the hydrophilic solvent with a hydrophobic solvent;

(d) passing the residual mixture to a crystallizer to precipitate alkali metal sulfate;

(e) separating and recovering the alkali metal sulfate from the crystallizer liquor; and (f) recycling the residual crystallizer liquor from the separation procedure of step (e) to dissolve additional alkali metal hydrogen sulfate.

8. A process according to claim 9 wherein the alkali metal hydrogen sulfate is $KHSO_4$ and the solid alkali metal sulfate product recovered is $K_2SO_4$.

9. A process according to claim 7 wherein the extraction mixture from step (c) which contains a mixture of hydrophilic solvent and hydrophobic solvent is subjected to distillation to separate the hydrophilic solvent and hydrophobic solvent.

10. A process according to claim 9 wherein the hydrophilic solvent is recycled to the extraction phase.

11. A process according to claim 10 wherein the hydrophobic solvent is recycled to extract additional sulfuric acid from the hydrophilic solvent.

12. A process according to claim 11 wherein the hydrophilic solvent is n-butyl alcohol and the hydrophobic solvent is n-pentane.

* * * * *